W. H. LONG & A. W. CASTLE.
MERCURY CONDENSER.

No. 191,805.            Patented June 12, 1877.

Witnesses            Inventor

William H. Long
Alexander W. Castle
by Dewey & Co.
Attys.

UNITED STATES PATENT OFFICE.

WILLIAM H. LONG AND ALEXANDER W. CASTLE, OF SAN JOSÉ, CAL.

IMPROVEMENT IN MERCURY-CONDENSERS.

Specification forming part of Letters Patent No. 191,805, dated June 12, 1877; application filed March 26, 1877.

*To all whom it may concern:*

Be it known that we, WILLIAM H. LONG and ALEXANDER W. CASTLE, of San José, county of Santa Clara and State of California, have invented an Improved Condenser; and we do hereby declare the following to be a full, clear, and exact description thereof, reference being had to the accompanying drawings.

In the condensation of mercurial vapors it has long been customary to perform this work in dry chambers, which are kept cool in various ways, and in some instances a spray of water has been showered down through a tower to meet the upwardly-moving vapor, so as to condense it. It has hitherto been found difficult to introduce mercurial vapors beneath water, so as to condense them by actual contact, on account of the difficulty in properly discharging such vapors at the bottom of a tank, and because of the pressure necessary to overcome the weight of the water and the consequent back pressure and attendant leakage of fumes between the furnace and condenser. These difficulties we design to overcome by the use of our invention.

Our invention relates to a novel condenser for mercurial and other vapors; and it consists of a vessel wherein the vapors are conveyed beneath the surface of the water contained therein by the centrifugal force caused by the motion of hollow open-ended arms, which unite with the central hollow conveying-tube, and are caused to rotate with it by suitable mechanism. A supply of cold water is kept up, a suitable trap is provided for withdrawing the metallic mercury without the water, and stops are placed within the condenser to prevent the rotation of the water by the action of the arms.

Figure 1:
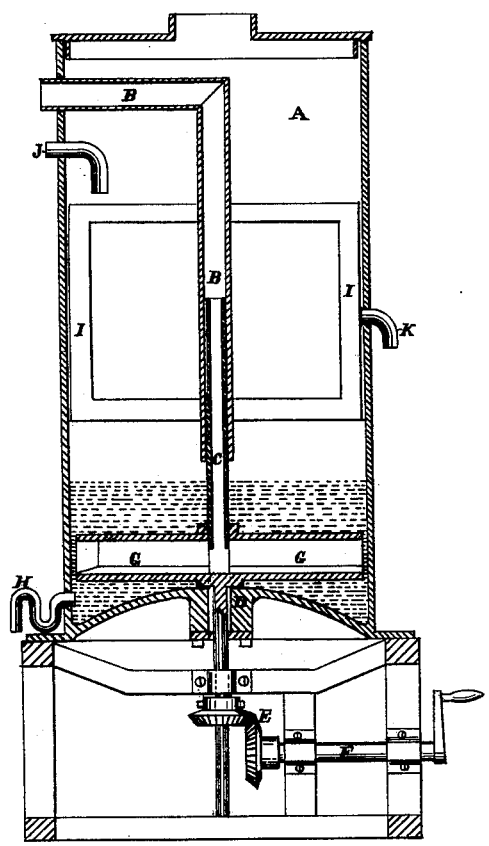
Figure 2:
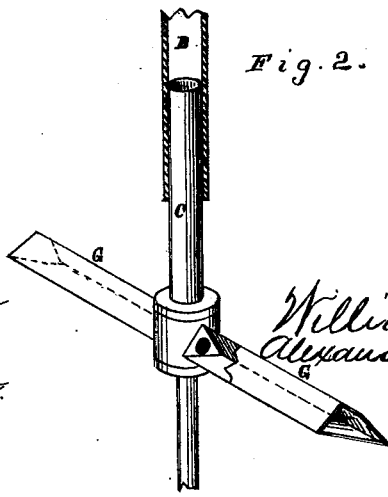

Referring to the accompanying drawings for a more complete explanation of our invention, Figure 1 is a vertical section of our condenser. Fig. 2 is a detail view, partly in section, of the hollow open-ended arms and pipes.

A is a cylindrical chamber, of which as many may be placed in succession as may be desired. This chamber has a pipe, B, which enters near the top, and at the center is bent so as to extend down toward the bottom in an axial line of the chamber. This pipe is stationary, and another pipe, C, extends upward into this pipe B, so as to turn easily, but make a close joint. The journal of the pipe C extends through a stuffing-box, D, at the bottom of the vessel or chamber, and by means of a barrel-gear, E, and shaft F, motion is communicated to the pipe C. Near the bottom of the chamber this pipe is provided with hollow arms G G. In the present case we have shown two arms projecting from opposite sides of the pipe C, but it will be seen that as many may be used as may be useful or necessary. These arms are made of any desirable shape; but we have shown them in the present case as triangular in section, this form giving less resistance as the arms pass through the water. At their extremities these arms are bent, or, as in the present case, made with an opening at the back of the outer end.

The operation will then be as follows: The furnace being in operation, the fumes will arrive at the chamber through the pipe B. The pipe C is caused to rotate with sufficient rapidity to produce a vacuum in the arms G, resulting from their passage through the body of water, said arms also acting as agitators during their passage through the water. This causes the fumes to rush down the pipe C, out through the arms G, and thence into the water, being thoroughly distributed by the movement, and discharged without any objectionable back pressure upon the furnace or retort. The mercury will thus be condensed and will fill the rim around the edge of the bottom, which is made convex in the center for that purpose. When a sufficient amount has collected the mercury will commence to flow out through the pipe H, which is bent upon itself, as shown, so as to form a trap and prevent any water from escaping.

As the tendency of the rotating arms would be to create a revolution of the water in the chamber, we prevent this by the introduction of wings I around the sides of the chamber, if it is cylindrical; but if the chamber is square its shape would in a great measure rectify this tendency.

The water is kept cool by allowing the current to enter at the pipe J and escape at K. The top of the chamber is perforated for the escape of any uncondensed fumes or gases which may be led by pipe into another like chamber. As each chamber is provided with its own exhausting or vacuum-producing mechanism it will be manifest that as many as may be desired can be used without producing any back pressure or influence upon any of the others.

It will be noticed that the arms act as agitators, thereby thoroughly distributing the vapor through the water, and dispensing with an additional agitating device, which has been found necessary where, in place of the arms, a centrifugal wheel was used consisting of a hollow circular disk.

Having thus described our invention, what we claim, and desire to secure by Letters Patent, is—

1. A fume or vapor condensing apparatus, consisting of the water-chamber A, with its conveying-pipe B, and the rotary pipe C, having the hollow arms G, substantially as and for the purpose described.

2. A fume or vapor condensing apparatus, consisting of a water vessel or chamber, A, with a conveying-pipe, B, in combination with the rotary pipe C, carrying hollow open-ended arms G, substantially as and for the purpose specified.

3. The rotary hollow shaft C, with its arms G constructed so their rapid rotation in water will form a vacuum and draw the fumes into the water, in combination with the wings I, to prevent an undue movement of the water, substantially as described.

In witness whereof we have hereunto set our hands and seals.

WILLIAM H. LONG. [L. S.]
ALEXANDER W. CASTLE. [L. S.]

Witnesses:
   JAMES M. BRALY,
   EZRA S. BRADLEE.